United States Patent
Jayaraman et al.

[11] Patent Number: 6,101,390
[45] Date of Patent: Aug. 8, 2000

[54] CALIBRATION TABLE GENERATION FOR WIRELESS LOCATION DETERMINATION

[75] Inventors: Sriram Jayaraman, San Bruno; Mati Wax, San Ramon; Oliver A. Hilsenrath, Alamo, all of Calif.

[73] Assignee: US Wireless Corporation, San Ramon, Calif.

[21] Appl. No.: 09/064,649

[22] Filed: Apr. 22, 1998

Related U.S. Application Data

[63] Continuation-in-part of application No. 08/780,565, Jan. 8, 1997, Pat. No. 6,026,304.

[51] Int. Cl.[7] ................................................. H04Q 7/20
[52] U.S. Cl. .......................... 455/456; 342/457; 340/988
[58] Field of Search ..................... 455/456, 457, 455/422, 67.1, 67.4, 67.6; 342/457, 386, 387; 370/328; 340/990, 992, 995

[56] References Cited

U.S. PATENT DOCUMENTS

| | | | |
|---|---|---|---|
| 5,272,638 | 12/1993 | Martin et al. | 455/456 |
| 5,508,707 | 4/1996 | LeBlanc et al. | 342/457 |
| 5,512,908 | 4/1996 | Herrick | 342/387 |
| 5,570,412 | 10/1996 | LeBlanc | 455/456 |
| 5,587,929 | 12/1996 | League et al. | 342/159 |
| 5,729,457 | 3/1998 | Seymour | 455/456 |

*Primary Examiner*—Dwayne D. Bost
*Assistant Examiner*—Erika A. Gary
*Attorney, Agent, or Firm*—Lumen Intellectual Property Services

[57] ABSTRACT

A system and method is provided for processing a calibration table used in a wireless location finding system. The initial calibration table data comprises points partitioned into routes followed by moving vehicles, where each point comprises a wireless signal signature and corresponding geographical location. The method comprises calculating, for each point, a list of neighboring points; and generating, for each route, a plurality of geographical bins covering all points in the route. Each bin has a bin location and a bin signature derived from those of the points within the bin. The resulting calibration table, which contains fewer redundant data points than the original calibration table data, may be used in a location finding system for quickly identifying the location of wireless transmitters in real time.

7 Claims, 6 Drawing Sheets

Data Association Procedure

CALIBRATION TABLE GENERATION FOR WIRELESS LOCATION DETERMINATION

This application is a continuation-in-part of U.S. patent application Ser. No. 08/780,565, filed Jan. 8, 1997, now U.S. Pat. No. 6,026,304 which is incorporated herein by reference.

FIELD OF THE INVENTION

This invention relates generally to methods for wireless location determination. More specifically, it relates to efficient methods for generating calibration tables for location determination in a cellular telephone network.

BACKGROUND

Known techniques for determining in real time the location of a cellular phone are based upon techniques such as direction finding (DF), time of arrival (TOA), and time difference of arrival (TDOA). These techniques, however, cannot accurately and reliably locate transmitters in severe multipath environments. An alternate approach to the location determination problem is disclosed by Hilsenrath et al. in U.S. patent application Ser. No. 08/780,565 (which is not admitted to be prior art with respect to the present invention by its mention in this Background section). Their approach, which takes advantage of multipath signals rather than attempting to mitigate or avoid them, measures a signal signature and determines a location by matching the signature with a calibrated database of signature-location pairs. In other words, rather than calculating a location from the signal signature, the location is determined by matching the signature with a calibrated signature in a database of known signature-location pairs.

In order to conserve data storage resources and improve the speed and efficiency of the location finding process, it is desirable to generate an optimal signature-location database.

OBJECTS AND ADVANTAGES OF THE INVENTION

Accordingly, it is a primary object of the present invention to provide a method for efficiently generating an optimal signature-location database from data collected from multiple overlapping and/or intersecting vehicle trajectories. It is a further object of the invention to provide a method for producing an optimal signature-location database from data based upon arbitrary and/or uncontrolled vehicle trajectories. Another object of the invention is to provide a method for efficiently integrating new data into an optimized calibration database to obtain a new optimal database. These and other objects and advantages of the present invention will become apparent from the following description and associated drawings.

SUMMARY OF THE INVENTION

In one aspect of the invention, a method is provided for generating a calibration table comprising wireless signal signatures and corresponding geographical locations. The method comprises collecting wireless signal and location data corresponding to points along a plurality of geographical routes; calculating, for each point, a list of neighboring points; and generating contiguous geographical bins covering the points, where each bin has a bin location and a bin signature. In a preferred embodiment, the generating step comprises (a) calculating a bin covering a current point and a plurality of successive unbinned points; (b) tagging the current point and the plurality of successive points as binned; (c) incrementing the current point to a next successive point; and (d) repeating steps (a) to (c).

In another aspect of the invention, a method is provided for processing a calibration table comprising points partitioned into routes. The method comprises calculating, for each point, a list of neighboring points, where each point comprises a wireless signal signature and corresponding geographical location; and generating, for each route, a plurality of geographical bins covering all points in the route, where each bin has a bin location and a bin signature. In a preferred embodiment, the calculating step comprises (a) calculating route neighbor lists of neighboring points within each route; and (b) calculating a total neighbor list of neighbors within all routes. In addition, the generating step comprises (a) calculating a bin covering a succession of unbinned points in the route; (b) tagging the succession of unbinned points as binned; and (c) repeating steps (a) and (b) for successive points in the route.

In another aspect of the invention, a wireless location finding system is provided. The system comprises a receiver for collecting wireless signal signatures from mobile transmitters; and a processor connected to the receiver. The processor is programmed to (a) associate the signal signatures corresponding to a calibration vehicle with temporally tagged geographical location data to produce a sequential set of route data points; (b) generate a plurality of bins covering the route data points, wherein each bin has a bin location and a bin signature; (c) match a signal signature corresponding to an unknown vehicle with a set of likely bin signatures; and (d) output a set of likely bin locations corresponding to the set of likely bin signatures.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

The preferred embodiment of the present invention will be described within the context of a wireless phone location system comprising a collection of base stations and mobile handsets. An example of such a system is disclosed by Hilsenrath et al. in U.S. patent application Ser. No. 08/780, 565. Other systems, however, are also compatible with the present invention, and will benefit from the techniques disclosed herein. Generally, the present invention is applicable to any system for generating calibration tables that is based on the measurement of wireless signal parameters and corresponding location information. The signal parameters may comprise, alone or in combination, DF information, TOA information, TDOA information, channel covariance matrix information, or other signal information derived from one or more base stations. The location information may comprise, alone or in combination, satellite-based positioning data, dead reckoning data, or other data derived from known navigational or positioning methods.

Figure 1:
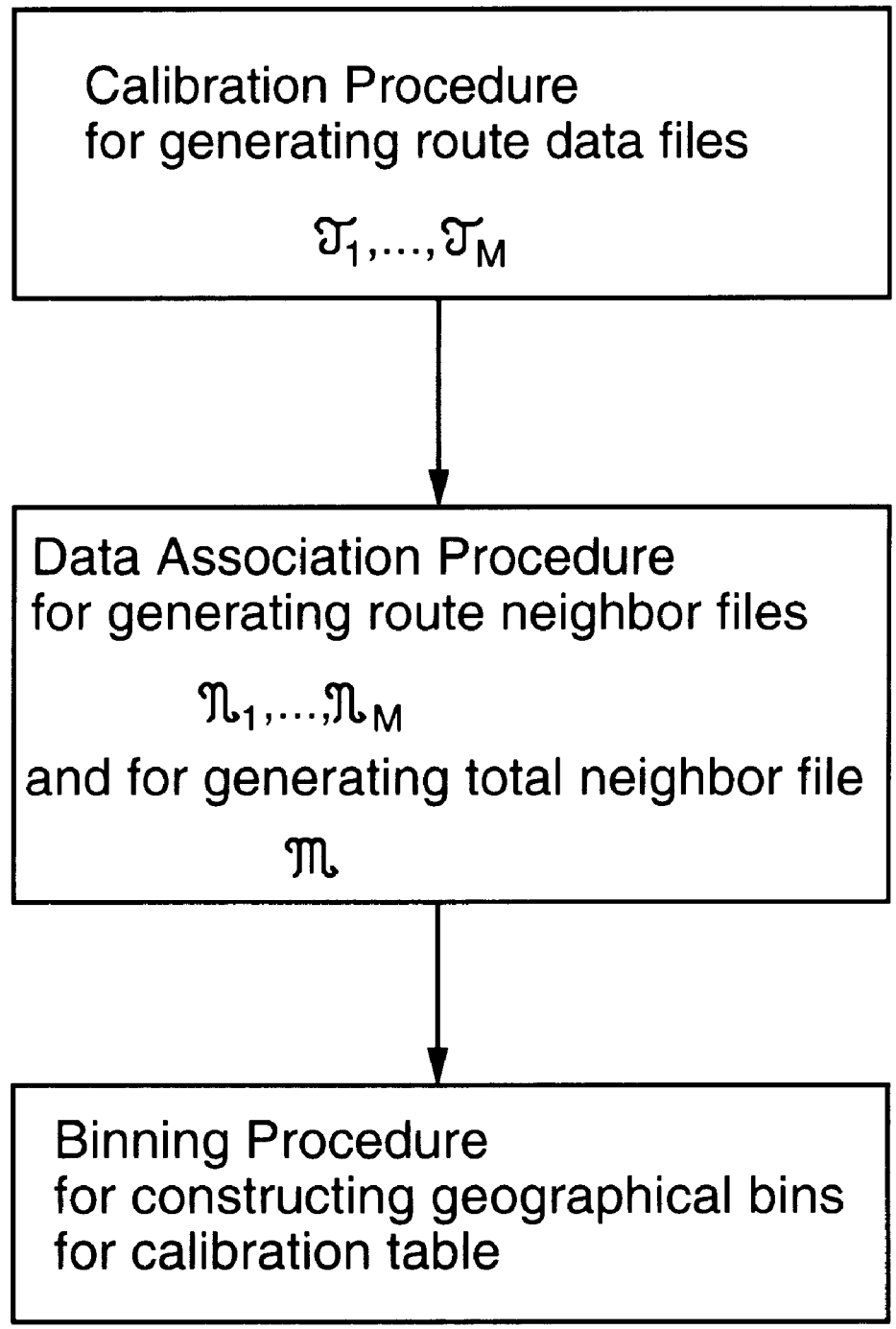
FIG. 1 is a flow chart outlining steps of a preferred embodiment of the invention.

FIG. 1 illustrates three aspects of the preferred embodiment: a calibration procedure for generating route data files from wireless signals and GPS location data, a data association procedure for generating route neighbor files and a total neighbor file from the route data files, and a binning procedure for constructing geographical bins of the calibration table. These steps will now be described separately in detail.

Calibration Procedure

In a calibration procedure according to the present invention, a calibration vehicle follows an arbitrary trajectory within a service region of a base station. The vehicle contains a cellular handset transmitting on a predetermined frequency channel, and also contains a GPS receiver and a computer for storing the real-time GPS position data of the vehicle along its trajectory. In a typical calibration procedure, the GPS location data along the trajectory are periodically stored together with the GPS clock time-stamp, typically at intervals on the order of 10 to 100 ms. Meanwhile, the transmitted signal from the cellular phone is received at an antenna array of the base station, which is also equipped with a GPS receiver, and the signal signature is stored with the GPS clock time stamp. When the data from the vehicle and the base station are combined and processed, differential GPS correction data obtained from the base station are used to determine with high accuracy the vehicle location r corresponding to each measured signature, which comprises, for example, a signal covariance matrix C. The signal signature and location information are then stored as raw calibration data at the base station.

Note that the calibration procedure may include the simultaneous use of several base stations and/or several vehicles moving within the service area. In addition, each vehicle may include several phones operating on different frequencies. For example, a set of 6 phones in a vehicle may be used to transmit at frequency intervals of 2 MHz in order to provide the signature data with frequency coverage across a 10 MHz bandwidth. In this case, the raw calibration data contains 6 signatures corresponding to the 6 frequencies for each location along the vehicle trajectory. It will also be appreciated that the location data may be derived from techniques other than, or in addition to, GPS techniques. For example, the GPS location information can be supplemented by dead reckoning or other navigational information. Such supplementary location information is especially useful in cases where GPS reception is poor. The supplementary location information can be stored with the GPS information and post-processed in an off-line procedure as described above. Alternatively, the location information can be transmitted in real time to the base station during the calibration procedure.

The result of the calibration procedure is a sequential set of raw calibration data for a single trajectory, including a set of covariance matrices $C=\{c_1, \ldots, c_N\}$ and a set of N corresponding locations $R=\{r_1, \ldots, r_N\}$. The raw calibration data for a single trajectory is conveniently represented as a single set of ordered pairs, $T=\{(c_1,r_1), \ldots, (c_N,r_N)\}$ indexed by the integers 1 to N. Because locations $r_i$ and indices i are in one-to-one correspondence, locations may be identified by their corresponding location index, and vice versa.

Typically, the calibration procedure will use one or more vehicles following M routes at the same or different times to produce M respective sets of raw calibration data, $T_1, \ldots, T_M$. The raw data contains redundancy due primarily to arbitrary and uncontrolled vehicle speeds and trajectories. A stopped or very slow moving vehicle, for example, results in many redudant data points corresponding to nearly the same location. Overlapping route trajectories also result in redundant data points. A primary object of the present invention is to remove these redundancies in order to generate an optimal calibration table from this raw data. The method comprises two main parts: data association and grid generation.

The raw data collected from M routes is stored in a set of M files, which are also represented by $T_1, \ldots, T_M$. Each file $T_m$ contains a temporally sequential list of ordered pairs $(c_1,r_1), \ldots, (c_{N(m)},r_{N(m)})$, where N(m) is the number of data points in route m. Each data point, therefore, may be assigned a unique index pair (m,n), where m=1, . . . ,M specifies the route and n=1, . . . ,N(m) specifies the data point within the route, as shown in Table 1.

TABLE 1

| Route 1 | Route 2 | . . . | Route m | . . . | Route M |
|---------|---------|-------|---------|-------|---------|
| (1, 1)  | (2, 1)  |       | (m, 1)  |       | (M, 1)  |
| (1, 2)  | (2, 2)  |       | (m, 2)  |       | (M, 2)  |
| .       | .       |       | .       |       | .       |
| .       | .       |       | .       |       | .       |
| (1, n)  | (2, n)  | . . . | (m, n)  | . . . | (M, n)  |
| .       | .       |       | .       |       | .       |
| .       | .       |       | .       |       | .       |
| (1, N(1)) | (2, N(2)) |   | (m, N(m)) |     | (M, N(M)) |

Note that each route m will usually have a different number of data points N(m). The columns of Table 1, therefore, do not necessarily have the same number of rows.

Data Association

Figure 2:
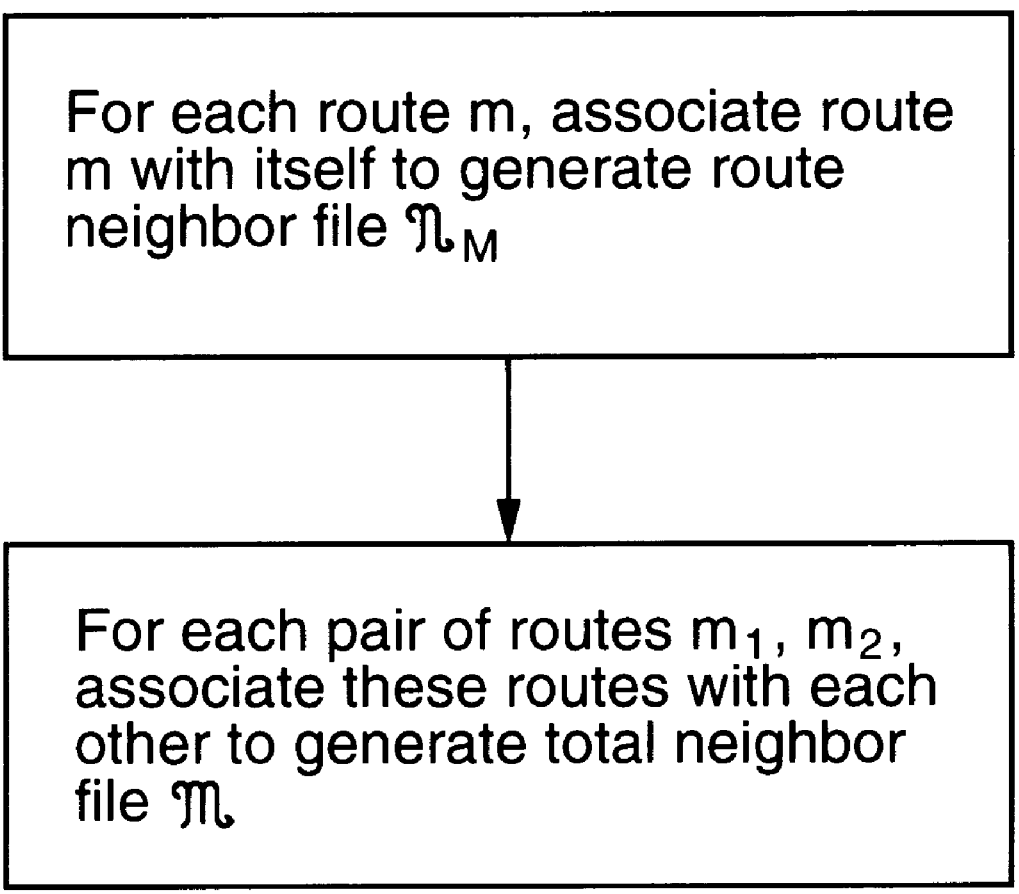
FIG. 2 is a flow chart outlining steps of a data association procedure according to a preferred embodiment of the invention.

As shown in FIG. 2, the data association procedure is separated into two steps. The first step generates a route neighbor file for each route, while the second step generates a total route neighbor file for all routes.

The first step is performed as follows. For each data point (m,n) in a route m, a list $n_m$ of neighboring data points in the same route m is determined. A neighboring data point is defined to be any data point whose location is less than a predetermined distance D from the location of (m,n). In the preferred embodiment, the predetermined distance D is 5 to 10 meters, as this is the approximate accuracy of present GPS receivers and is comparable to a lane width on a typical road. It will be appreciated that other distances D may also be used. In this manner, a route neighborhood file $n_m$ for route m is constructed which contains a route neighbor list for each point in the route. Table 2 shows an example of a route neighborhood file $n_m$ containing route neighbor lists in route m for all points in route m.

TABLE 2

Route Neighbor File

| Data Point | Route Neighbor List |
|---|---|
| (m, 1) | (m, 2); (m, 3) |
| (m, 2) | (m, 1); (m, 3); (m, 4) |
| . | . |
| . | . |
| (m, n) | (m, n − 2); (m, n − 1); (m, n + 1); (m, n + 2); (m, n + 3) |
| . | . |
| . | . |
| (m, N(m)) | (m, N(m) − 2);(m, N(m) − 1) |

Similarly, a route neighborhood file is produced for each of the M routes, resulting in a total of M route neighborhood files $\mathcal{n}_1, \ldots, \mathcal{n}_M$ corresponding to each of the routes $\mathcal{T}_1, \ldots, \mathcal{T}_M$.

After the M route neighborhood files are constructed, the second step of the data association procedure is performed. In this step, a total neighborhood file $\mathcal{n}$ is constructed, combining information from all the routes. The total neighborhood file $\mathcal{n}$ contains, for each data point in each route, a total neighbor list. The total neighborhood list for a point contains all the neighbors of the point selected from all data points in all routes. In other words, the total neighbor list for a point contains not only neighbors in the same route, but also neighbors taken from all the other routes. Table 3 shows an example of a total neighborhood file.

TABLE 3

Total Neighbor File

| Data Point | Total Neighbor List |
|---|---|
| (1, 1) | (1, 2); (1, 3); (2, 12); (2, 13); . . . ; (M, 54); (M, 55) |
| . | . |
| . | . |
| (1, N(1)) | (1, N(1) − 1); (2, 11); (2, 12); . . .; (M, 128) |
| . | . |
| . | . |
| (m, 1) | (1, 32); (2, 78); . . .; (m, 2); (m, 3); . . .; (M, 98) |
| . | . |
| . | . |
| (m, N(m)) | (3, 45); . . .; (m, N(m) − 1); . . . ; (M − 1, 32) |
| . | . |
| . | . |
| (M, 1) | (1, 16); . . .; (M, 2); (M, 3) |
| . | . |
| . | . |
| (M, N(M)−) | (2, 68); (2, 69); . . .; (M, N(M) − 2); (M, N(M) − 1) |

The data processing described above may be performed conveniently through the repeated execution of certain general procedures. A fundamental procedure NEIGHBOR($m_1$, $n_1$, $m_2$, $n_2$) checks if data point ($m_1$, $n_1$) is a neighbor of ($m_2$, $n_2$) by calculating the Euclidean distance between the GPS position $r_{n_1}$ in route m1 with GPS position $r_{n_2}$ in route $m_2$. If the distance is less than D meters, then the procedure returns a TRUE value; otherwise it returns a false value. Using this procedure, it is straightforward to devise a procedure ASSOCIATE_ROUTES($m_1$, $m_2$) that calculates, for each data point in route $m_1$, the list of neighboring points in route $m_2$. With $m_1$=$m_2$, this procedure can be used to generate the initial route neighborhood files. This procedure can also be used to generate the total neighborhood file from the collection of route neighborhood files by calling the procedure for all cases where $m_1 \neq m_2$ and adding the results of each call to the total neighborhood file. Note that since ASSOCIATE_ROUTES is symmetric, i.e. ASSOCIATE_ROUTES($m_1$,$m_2$)=ASSOCIATE_ROUTES($m_2$,$m_1$), half of the distance calculations need not be performed.

A new route M+1 can be added to the total neighborhood file by calling ASSOCIATE_ROUTES(M+1,m) for all m, and also calling ASSOCIATE_ROUTES(m,M+1) for all m. The first series adds to the new route all neighbors from all existing routes, while the second series of calls adds to the existing routes the neighbors in the new route. Similarly, any route m can be deleted from the total neighborhood file by removing all data points (m,1), . . . ,(m,N(m)) and removing all references to these data points which may be contained in the total neighborhood lists of the data points for the other routes.

Binning

Figure 3A:
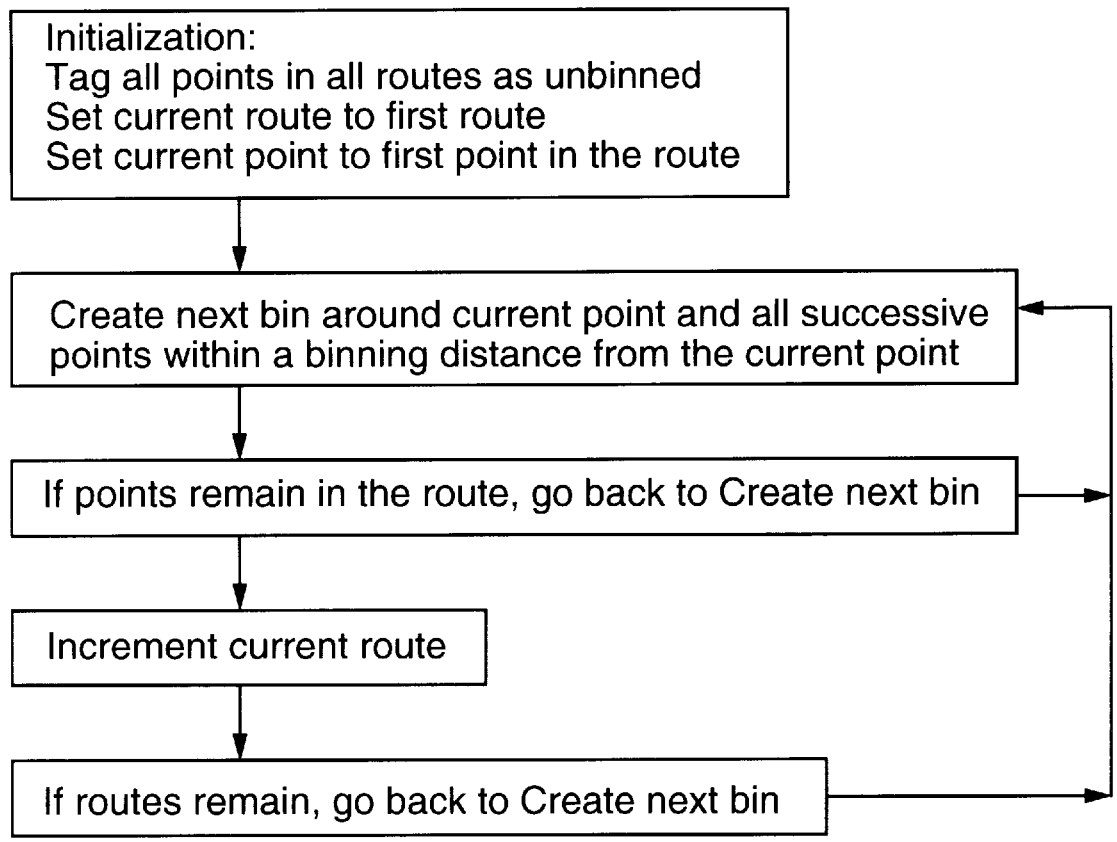
FIG. 3A is a flow chart outlining steps of a binning procedure according to a preferred embodiment of the invention.
Figure 3B:
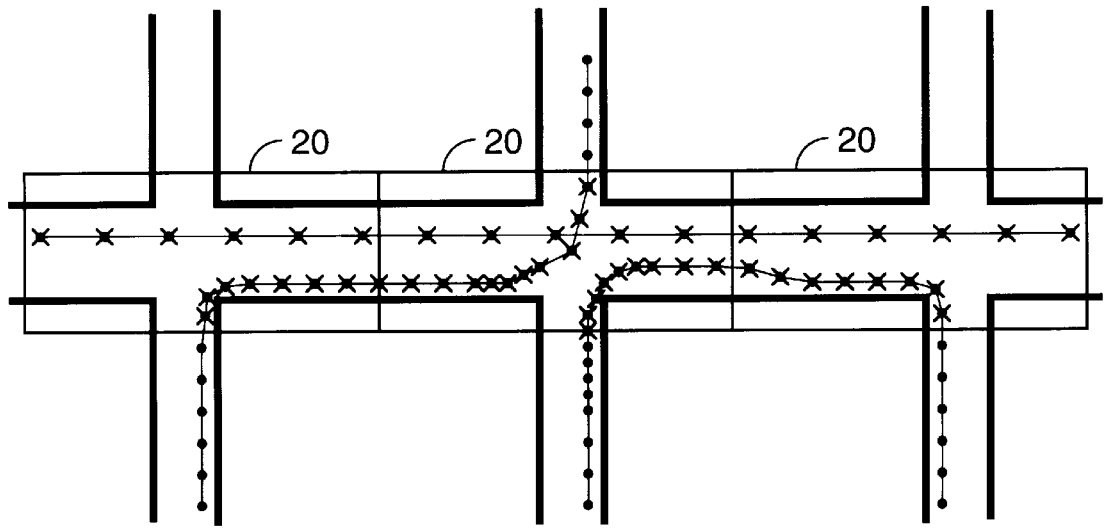
FIG. 3B is an illustration of a binning procedure according to the invention as applied to an area comprising three routes, where one route has been binned.
Figure 3C:
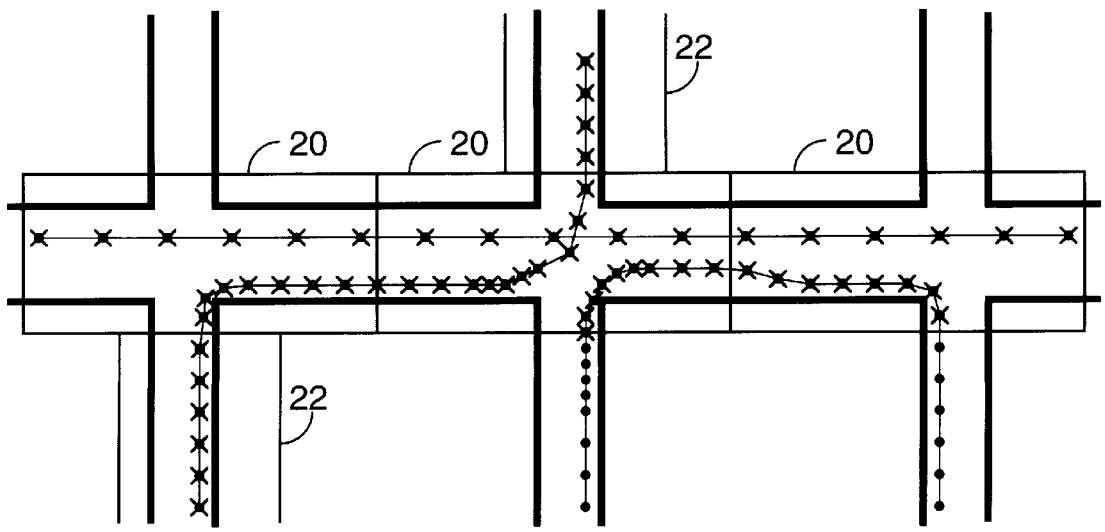
FIG. 3C is an illustration of a binning procedure according to the invention as applied to an area comprising three routes, where two routes have been binned.

The binning procedure, shown in FIGS. 3A–3C, uses the contents of the total neighborhood file to construct a collection of geographical bins 20, 22 that represent the area covered by the routes. A bin is defined to be a contiguous geographical region corresponding to a portion of one or more routes. The binning step constructs a collection of bins that correspond to the trajectories of the routes. This collection of bins is a basic component of the final calibration table.

Bins are created sequentially as follows. Initially, all the points in all the routes are tagged as unbinned (unbinned points are indicated in the FIGS. 3B and 3C by dots, while binned points are indicated by dots with an 'X'). A current route variable is initially set to be the first route, and a current point in the current route is initially set to be the initial point in the route. Next, a bin is created that covers a sequence of points starting with the current point and ending with the last successive point in the route that is still within a minimum binning distance from the current point. The bin is assigned a bin location and a signature based on the signatures and locations of the points in the bin, as will be described in more detail below in relation to FIGS. 4A–4D. After the bin is created, the current point is the first point along the route outside the bin. This point becomes the first point for the next bin, and a new bin is created. Bins are successively created along the route in this way until no points remain in the route. FIG. 3B illustrates the result of binning a single route, where bins have been created. After the first route is binned, the current route is then incremented and the binning is repeated in the same manner for the next route. FIG. 3C illustrates the result of binning a second route, where bins 22 are new bins. When all routes have been binned in this way, the binning procedure is completed.

As shown in FIGS. 4A–4D, the step of creating a single bin 20 is performed as follows. An initial bin point is set to be the current point. All the neighbors of the current point are identified by inspecting the total neighbor list for the point. These neighbors are the points (from any route) that are within a circular neighborhood 24 of the current point. From the list of these neighbors and the current point itself, all the unbinned points are selected. These selected points will be tagged as binned when the bin is completed, so that they are not included as data for other bins. The covariance matrices of these points are then averaged to form an average covariance matrix C associated with the current point. From this average covariance matrix, a signature corresponding to this point is then determined. In the preferred embodiment, the signature corresponding to a covariance matrix C is the subspace spanned by the dominant eigenvectors of C. Alternatively, the covariance matrix itself can be used as the signature. In the case where there are no unbinned points among the neighbors of the current point, then no signature value is calculated for the point.

Figure 4A:
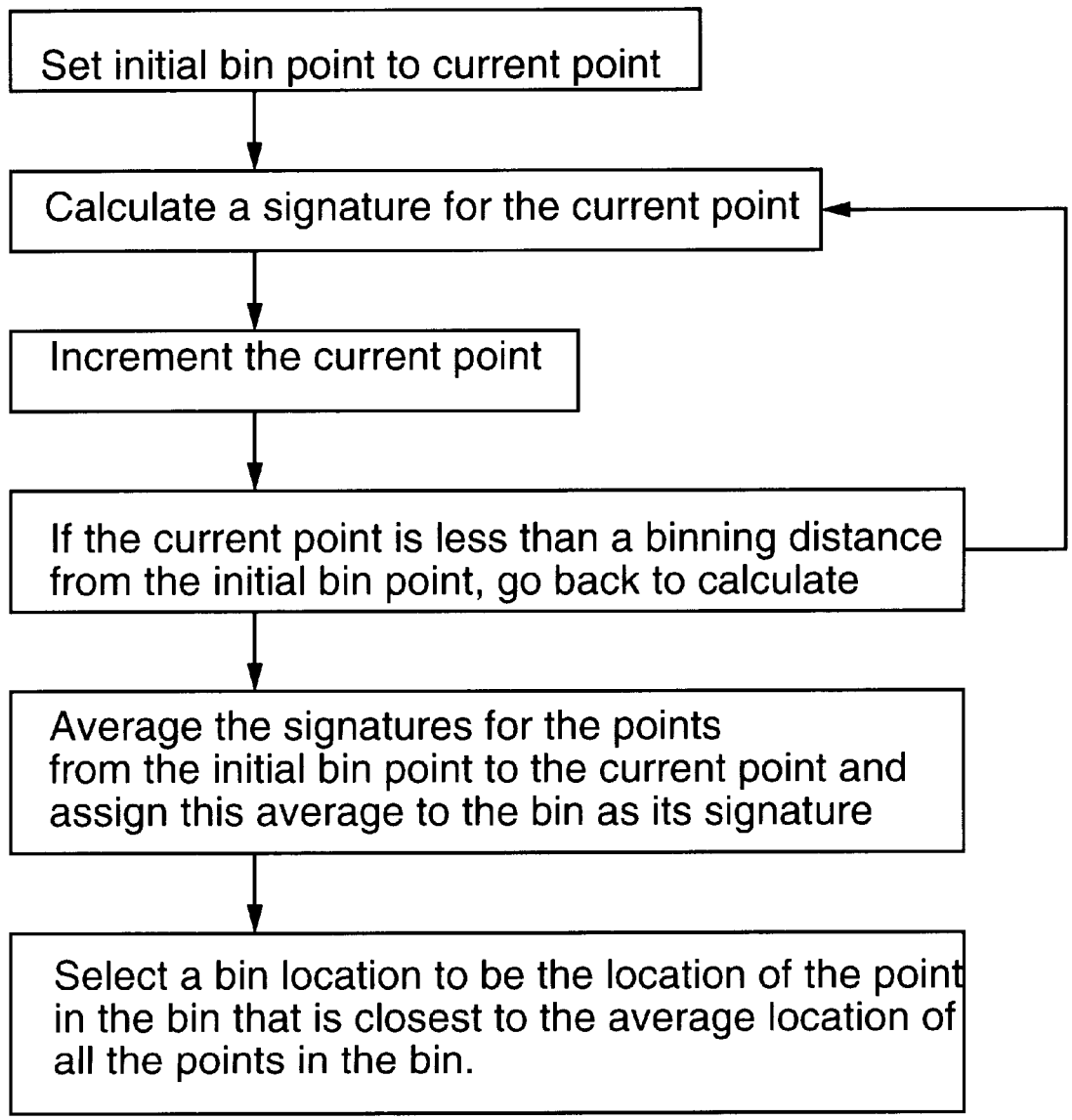
FIG. 4A is a flow chart outlining steps of a procedure to create a bin according to a preferred embodiment of the invention.
Figure 4B:
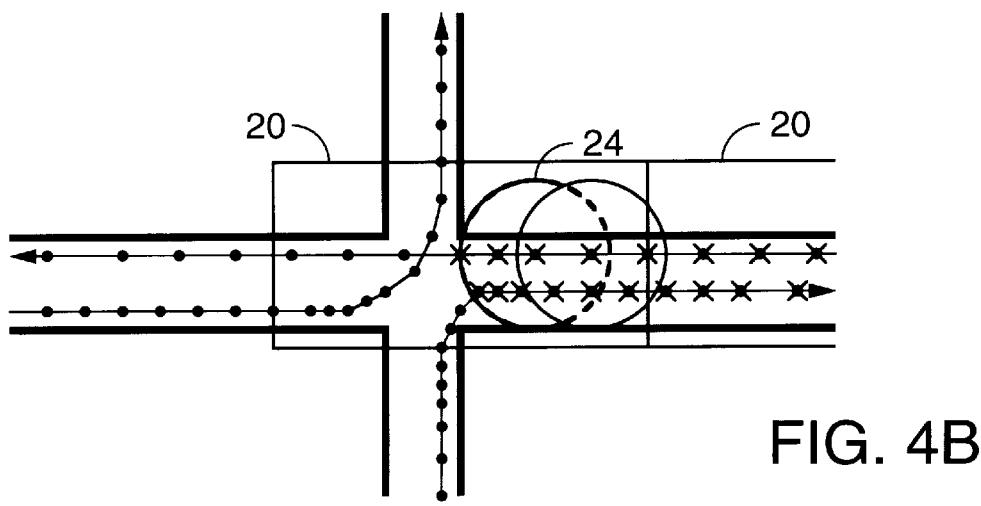
FIGS. 4B–4D illustrate detailed steps of a binning procedure according to the invention as applied to points within a single bin.
Figure 4C:
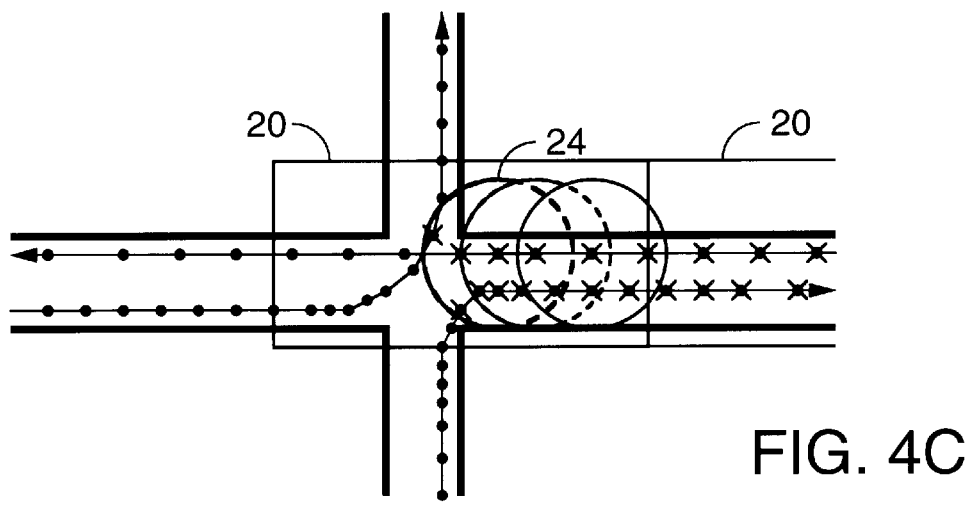
Figure 4D:
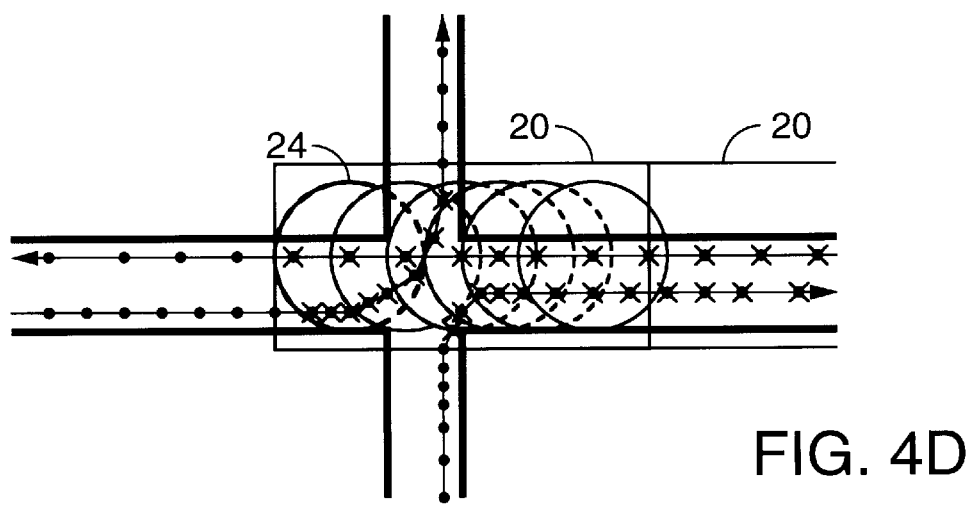

The current point is then incremented to the next point in the current route. If the current point is less than a predetermined binning distance (e.g. 30 meters) from the initial bin point, then the above procedure is repeated to again produce a signature for this point. A repetition of this procedure is shown in FIGS. 4B–4C. As a result, one obtains a series of signature values that correspond to points along the current route within the predetermined binning distance of the initial bin point. In general, the binning distance may be selected to be any value greater than the neighbor distance D. In the preferred embodiment, the binning distance is selected to be approximately 50 meters for typical suburban environments. For dense urban environments, the binning distance is preferably 30 meters, while in rural environments the binning distance is 50 meters or more.

The signature values in a given bin are then averaged to form a bin signature, and the corresponding locations are averaged to form an average location. A bin location is selected to be the location of the data point closest to the average location.

This process is continued until the points in the route are all binned. The other routes are then binned in the same way, resulting in a calibration table that incorporates the data from all the routes. This table may then be used in a system for location finding by measuring a signal from a transmitter whose location is unknown, comparing the signal with the signatures stored in the calibration table, and selecting one or more likely locations. The details of such a method are disclosed in Hilsenrath et al. In a preferred embodiment, distinct calibration tables are constructed for various different frequency bands in use, e.g. one calibration table for each 3 to 6 MHz band of frequency channels. Thus, the calibration table used to derive a location will be selected in dependence upon the frequency of the signal.

Those skilled in the art will appreciate from the foregoing that this method has numerous advantages and variations. For example, data from a new route can be incorporated into an existing calibration table without repeating many calculations unnecessarily. In particular, data from a new route is used to create a new total neighbor file in the manner already described. All neighbors of the new route, as well as all the points in the new route, are tagged as unbinned. The calibration table can then be updated by executing the binning procedure for the new route.

It will also be appreciated the the foregoing method results in an optimized calibration table that does not contain temporally or spatially redundant data, and contains accurate data due to averaging within each bin. The method also enjoys the advantage that it does not place constraints upon the specific routes that the vehicles take. Those skilled in the art will recognize that the present method produces a contiguous map of a region, providing accuracies often exceeding those of existing survey maps. Thus, the present method has application to accurate map generation.

What is claimed is:

1. A method for generating a calibration table comprising wireless signal signatures and corresponding geographical locations, the method comprising:

collecting wireless signal and location data corresponding to a plurality of points along a plurality of geographical routes;

calculating, for each point in the plurality of points, a list of neighboring points selected from the plurality of points; and generating a plurality of contiguous geographical bins covering the plurality of points, wherein each bin in the plurality of bins has a bin location and a bin signature.

2. The method of claim 1 wherein the generating step comprises (a) calculating a bin covering a current point and a plurality of successive unbinned points; (b) tagging the current point and the plurality of successive points as binned; (c) incrementing the current point to a next successive point; and (d) repeating steps (a) to (c).

3. A computer-implemented method for processing a calibration table comprising a plurality of points partitioned into a plurality of routes, the method comprising:

calculating, for each point in the plurality of points contained in the calibration table, a list of neighboring points selected from the plurality of points, wherein each point comprises a wireless signal signature and corresponding geographical location;

generating, for each route in the plurality of routes, a plurality of geographical bins covering all points in the route, wherein each bin in the plurality of bins has a bin location and a bin signature.

4. The method of claim 3 wherein the calculating step comprises (a) calculating route neighbor lists of neighboring points within each route; and (b) calculating a total neighbor list of neighbors within all routes.

5. The method of claim 3 wherein the generating step comprises (a) calculating a bin covering a succession of unbinned points in the route; (b) tagging the succession of unbinned points as binned; and (c) repeating steps (a) and (b) for successive points in the route.

6. The method of claim 5 wherein the succession of unbinned points are separated by no more than a minimum binning distance.

7. A wireless location finding system comprising:

a receiver coupled to an antenna array for collecting wireless signal signatures from mobile transmitters; and a processor connected to the receiver, wherein the processor is programmed to (a) associate the signal signatures corresponding to a calibration vehicle with temporally tagged geographical location data to produce a sequential set of route data points;

(b) generate a plurality of bins covering the route data points, wherein each bin has a bin location and a bin signature;

(c) match a signal signature corresponding to an unknown vehicle with a set of bin signatures; and (d) output a set of likely bin locations corresponding to the set of likely bin signatures.

* * * * *